Aug. 18, 1936.   F. LANDBERG ET AL   2,051,049
AUTOMATIC PRESSURE GAUGE AND REGULATOR
Original Filed Aug. 19, 1932   2 Sheets-Sheet 2
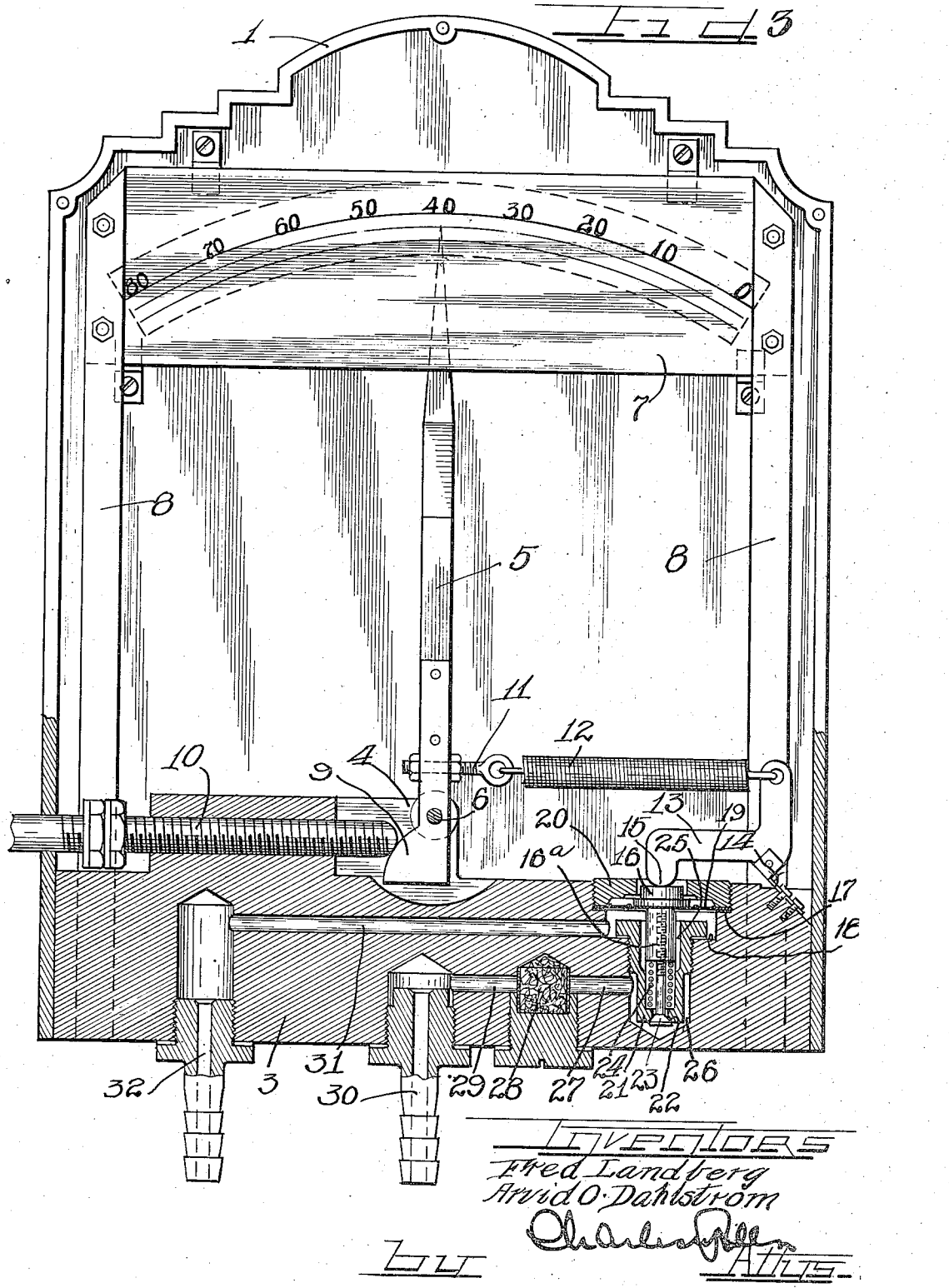

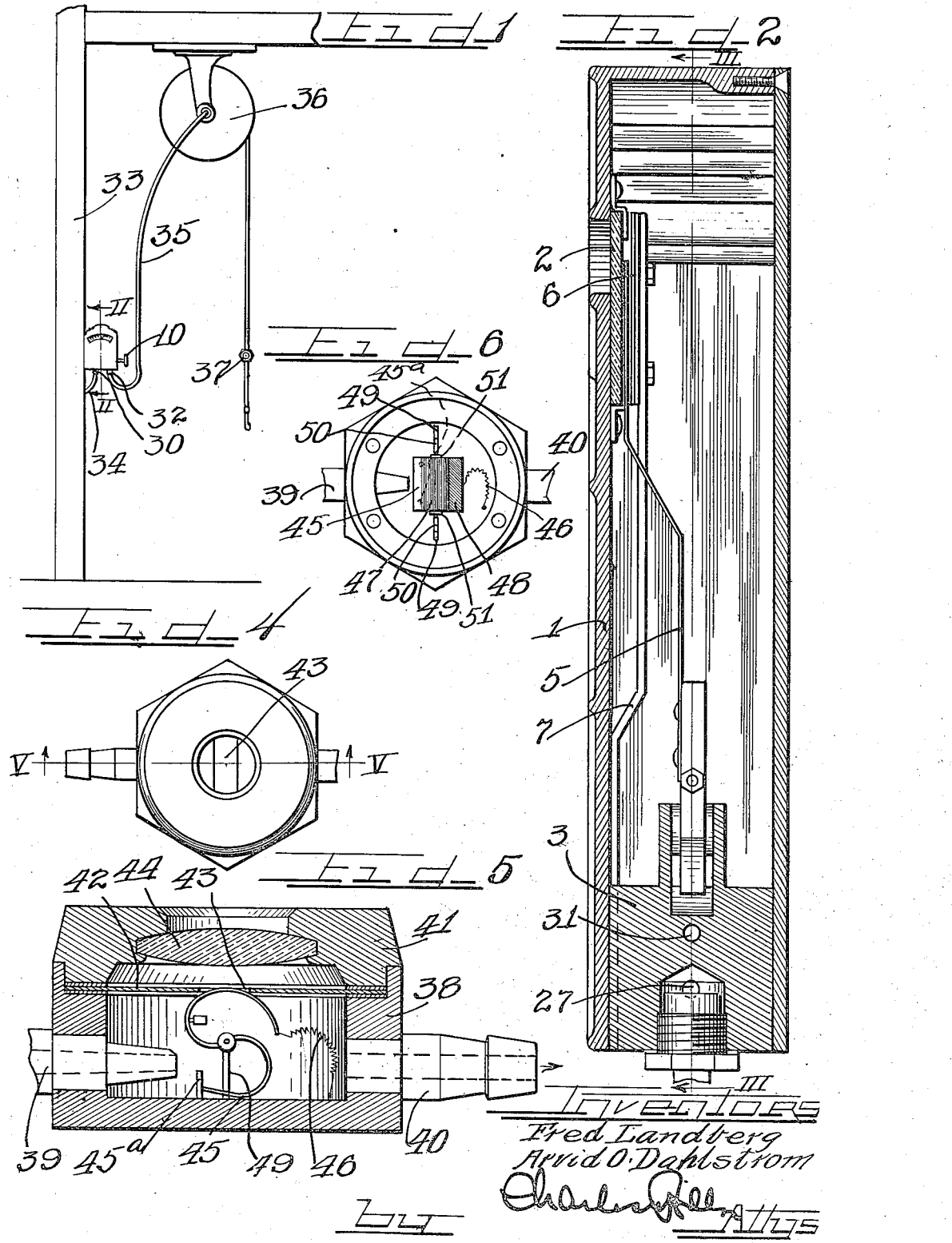

Patented Aug. 18, 1936

2,051,049

UNITED STATES PATENT OFFICE 2,051,049

AUTOMATIC PRESSURE GAUGE AND REGULATOR

Fred Landberg and Arvid O. Dahlstrom, Chicago, Ill., assignors to Charles E. Swann, Chicago, Ill.

Application August 19, 1932, Serial No. 629,438
Renewed January 21, 1936

14 Claims. (Cl. 50—5)

This invention relates to an automatic pressure gauge adapted primarily for use in connection with the blowing up of automobile tires, and is also adapted for other purposes.

The object of the invention is to provide a pressure gauge which automatically shuts off the supply of air when the pressure in the pneumatic tire has attained the desired pressure in combination with means for indicating to the attendant when the air has been shut off.

Another object of this invention is to provide a pressure gauge in which the indicating means is directly connected to the diaphragm which controls the cut-off valve with the adjusting means for the pointer being so arranged as not to affect the pressure on the diaphragm for a given setting of the pointer even though wear occurs in the adjusting means.

Another object of this invention is to provide means for limiting the movement of the pointer beyond predetermined limits, this limiting means being preferably adjustable, whereby if considerable wear occurs, the limiting stops can be readjusted to again limit the movement of the pointer within the desired limits preferably for the purpose of preventing the free end of the pointer from striking parts of the casing or other parts of the apparatus, whereby the pointer will not be bent and thus destroy the accuracy of the instrument.

Another object of this invention is to provide a unitary structure having an air passage therethrough in which air passage there is arranged a cut-off valve and an air cleaner.

Other objects of this invention will appear hereinafter as the description of this invention proceeds, the novel features, arrangements, and combinations being clearly set forth in the appended claims.

The invention comprises the novel structure and combinations of parts hereinafter described and more particularly pointed out and defined in the appended claims.

In the accompanying drawings which illustrate a preferred form of this invention and in which similar reference numerals refer to similar features in the different views:

Figure 1 is an elevational view of a pressure gauge involving this invention illustrating the same installed and ready for use.

Figure 2 is an enlarged sectional view taken upon the line II—II of the pressure gauge shown in Figure 1 looking in the direction of the arrows.

Figure 3 is an enlarged sectional view taken upon the line III—III of Figure 2 looking in the direction of the arrow.

Figure 4 is a top plan view upon an enlarged scale of an indicator adapted for use in the airline.

Figure 5 is an enlarged sectional view taken upon the line V—V of Figure 4 looking in the direction of the arrow.

Figure 6 is a top plan view of the indicator with parts removed.

In the illustrated embodiment of this invention, there is shown an enclosed casing 1 having a window 2 extending across the front face thereof and provided with a scale which is properly numbered for indicating pressures. The bottom of the casing is closed by a solid plug 3 which has a raised portion on its upper face upon which a pair of ears 4 are formed. A pointer 5 is pivoted between the ears 4 and extends upwardly adjacent the window 2. This pointer 5 is pivoted to the ears 4 by means of a pivot pin 6 which allows the same to freely swing. The upper portion of the pointer 5 operates in a guideway which is formed by the window 2 and a plate member 7 which extends transversely of the casing and is attached to uprights 8 which are secured to the front wall of the casing and are suitably offset as shown in Figure 2 to form the guideway.

Below the pivot point 6, the pointer is provided with a cam 9 which projects to one side and is adapted for engagement with a screw 10 which is adjustably mounted in the raised portion of the base. An adjustable screw 11 is attached to the pointer 5 and one end of a coil spring 12 is anchored to the screw 11. The other end of the coil spring 12 is connected to a bell crank lever 13 which is secured to a spring 14 attached to the base 3. The free arm of the bell crank lever 13 is provided with a knob or head 15 which is adapted for engaging the head 16 of a valve which is located in a well formed in the base 3.

The adjusting screw 10 has the nuts 40 and 41 threaded thereon between the abutment surface 42 on the casing and the abutment surface 43 on the plug 3. This limits the longitudinal movement of the adjusting screw and consequently the pivotal movement of the pointer 5. The nuts 40 and 41 are so arranged on the screw 10 as to stop the movement of the pointer in either of its extreme positions at a point such that the pointer does not engage the sides of the casing, whereby the pointer will not be bent by too much adjustment of the screw 10. If a considerable amount of wear occurs, either in the cam 9 or adjusting screw 10, and the pointer comes too close to the casing at one end of its path of travel, it is only necessary to adjust the nuts 40 and 41 to compensate for the wear which has occurred. Usually, however, this is not necessary except perhaps after years of service or hard usage.

The valve well is formed with a stepped wall creating thereby shoulders 17 and 18. A diaphragm 19 is supported upon the shoulder 17 and a cap 20 is threaded in the top of the well and bears against the diaphragm. A sleeve 21 which is hollow is threaded into the lower portion of the well below the shoulder 18. This hollow sleeve has an outlet port 22 at its lower end which is closed by a conical valve 23. It will be noted that the valve 23 is threaded into an enlarged portion 16a. A coil spring 24 surrounds the valve stem and abuts the enlarged portion 16a for urging the valve in an upward direction for closing the valve port 22. It will be noted that the bore of the sleeve 21 is enlarged at its upper portion in order to provide a passage 25 around the enlarged portion 16a. This enlarged portion extends below the enlarged portion 16a of the valve stem in order that the air may pass through such space. It will be further noted that the lower portion of the sleeve 21 is reduced to provide a passage 26 extends therearound. The passage 26 communicates with a duct 27 which is located in the base and which extends to a filter chamber 28. A duct 29 extends from the filter chamber to an air inlet nozzle 30 with which it communicates for receiving air from the compressor. The annular passage 25 around the valve stem communicates with the upper portion of the valve well which in turn communicates with a duct 31 formed in the base 3 and which communicates with an air discharge nozzle 32.

In Figure 1, it will be noted that the pressure gauge has been attached to a frame 33. The nozzle 30 is shown connected to a hose 34 which extends to an air pump or suitable compressor. An air delivery hose 35 extends from the nozzle 32 and dangles from a suitable support 36 upon the frame.

Before proceeding with the description, it is desirable to briefly describe the operation of the pressure gauge. It might be mentioned that the coil spring 12 that connects the pointer with the bell crank lever 13 is designed to normally hold the valve 23 in open position. By adjusting the screw 10, the pointer 5 may be caused to swing from one side to the other thus increasing or decreasing the tension of the coil spring 12. The tension of the coil spring 12 will normally hold the valve 23 in open position for the passage of air. The degree of tension of the spring 12 will of course determine the pressure applied to the valve. For example, if the pointer is adjusted to indicate 40 pound pressure on the scale, the tension of the coil spring 12 will exercise substantially 40 pounds of pressure upon the valve 23. Now, assume that a tire is being filled with compressed air, the air will flow through the nozzle 30 and through the valve housing and through the discharge duct 31 to the nozzle 32 which is connected to the tire. The flow of air will continue until the pressure in the tire reaches 40 pounds and at this point, the pressure on the diaphragm 19 will elevate the valve 23 and close the valve automatically so no more air can be forced into the tire. It will therefore be evident that the gauge will automatically shut off the supply of compressed air at any predetermined amount of pressure.

According to this invention, the pointer will be set at the desired pound pressure that is desired in the tire, the air is then turned on and when the pressure in the tire equalizes or slightly exceeds the tension of the spring 12, the valve 23 will be automatically closed. It is desirable in the use of such a pressure gauge to provide means for indicating to the operator when the tire is filled with air at the predetermined or preselected pressure. To this end an indicator 37, Figures 1, 4, 5 and 6, has been provided in the delivery hose 35. This indicator consists of a cylindrical casing 38 having a pair of oppositely extending nozzles 39 and 40 to which portions of the hose may be attached so that the air will be compelled to pass through the chamber in the casing. The casing is closed at its top by a cover 41 and between the cover and the body of the casing, there is a sheet-metal partition member 42 which is provided with a central slot 43. The cover member 41 is provided with a circular aperture which is closed by a transparent member 44 secured or carried by the cover. An S-shaped member 45 which may be made of metal or any suitable material is pivotally supported in the chamber of the casing 38. This S-shaped member is normally held in a predetermined position with one end abutting a stop 45a by means of a light spring 46 attached to the upper end thereof and anchored to the floor of the chamber. The upper portion of the S-shaped member is provided with a pair of differently colored sections 47 and 48. The section 47 may be red and the section 48 may be green. These colored sections are adapted to be observed through the slot 43. The S-shaped member may be supported in various ways but as a matter of illustration, a pair of upright members 49 are shown which have pivot arms 50 (Figure 6) directed toward each other. These pivot arms 50 are provided with bevel points which engage conical recesses in the bearing 51 that supports the S-shaped member.

When compressed air is passing through the delivery hose 35, it will strike the lower portion of the member 45 and rotate the same to bring the green portion 48 in register with the slot 43 to be observed by the attendant. As soon as the pressure in the tire equalizes the tension of the spring 12 and the valve 23 becomes automatically closed so that no more compressed air flows through the line, the spring 46 will retract the S-shaped member into the position shown in Figure 5 with the red portion observable through the slot 43 thereby indicating to the operator that the tire has been filled with air under the predetermined air pressure.

From the foregoing, it will be obvious that a very simple pressure gauge has been provided for governing or regulating the air pressure during the operation of filling a pneumatic tire and at the same time means are provided for indicating to the operator when the air pressure in the tire has reached the desired height.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. A device of the class described comprising a movable pointer, an adjustable member directly actuating said pointer, and adjustable limiting stops on said adjustable means for limiting the amount of movement of said adjustable means and as a result varying the limiting positions of said pointer.

2. A device of the class described comprising a movable pointer, an adjustable member directly actuating said pointer, and limiting stops on said adjustable means for limiting the amount of movement of said adjustable means and as a result of said pointer, said limiting stops being adjustable to change the limiting positions to which the pointer may be moved.

3. In a device of the class described, the combination with a fluid supply conduit for supplying fluid to a chamber, of a cut-off valve in said conduit for cutting off the flow of fluid through said conduit, a flexible diaphragm having one side thereof directly operatively connected to said valve to positively actuate said valve in a direction toward open position, a pivoted arm having a portion arranged on the opposite side of said diaphragm and operatively connected thereinto so as to move said diaphragm positively in a direction to open said valve if and when said lever is urged toward said diaphragm with a pressure greater than that urging the diaphragm toward said lever, a movable indicating pointer, means for indicating the position of said pointer, a spring directly connected at opposite ends thereof to said pointer and arm to exert a predetermined pressure on said lever for various positions of said lever relative to said arm, and means separate from the connection between said spring and its connections with said arm and pointer for setting said pointer in any of its various positions, whereby to determine the pressure exerted on said valve and the time of closing of said valve.

4. A device of the class described adapted to exert a predetermined pressure on a valve in a fluid conduit to hold said valve open until a back pressure in said conduit is reached sufficient to close said valve against the action of said device, comprising a movable arm adapted to be operatively connected to said valve, a movable pointer, a pointer position indicator cooperating therewith, a spring connected at its opposite ends to said pointer and arm, respectively, the movement of said pointer relative to said arm varying the pressure which said spring exerts on said arm to open said valve, and means separate from the connection between said spring and said arm and lever for moving said pointer relative to said arm to vary the said spring pressure, comprising a cam on said pointer and a cooperating movable element engaging said cam to actuate the same and consequently said pointer.

5. A device of the class described adapted to exert a predetermined pressure on a valve in a fluid conduit to hold said valve open until a back pressure in said conduit is reached sufficient to close said valve against the action of said device, comprising a movable arm adapted to be operatively connected to said valve, a movable pointer, a pointer position indicator cooperating therewith, a spring connected at its opposite ends to said pointer and arm, respectively, the movement of said pointer relative to said arm varying the pressure which said spring exerts on said arm to open said valve, and means separate from the connection between said spring and said arm and lever for moving said pointer relative to said arm to vary the said spring pressure, comprising a cam on said pointer and a cooperating movable element for actuating said pointer, spring, arm, cam, and cam actuating means being movable in substantially the same plane.

6. In a device of the class described comprising a lever having means therein for placing a load on a valve to hold the same open against the action of closing means therefore, a movable indicating pointer, scale position indicia cooperating therewith, a spring directly connected at its opposite ends to said lever and pointer, the connection at one end of said spring including an adjustable member for varying the spring tension for the same relative positions of said lever and pointer, and means separate from said spring and its connection with said lever for moving said lever to various positions of adjustment.

7. A loading means for valves and the like comprising a pivoted lever having one end thereof adapted to contact with means connected to a valve in a pressure conduit so that said lever actuates said valve when said lever is moved, a movable indicating pointer, a spring connection directly connected at its opposite ends to said indicating pointer and lever, and means separate from said connection for moving said pointer to a predetermined position of adjustment, whereby wear on said means for moving said pointer does not affect the pressure on said valve when said pointer is in its various set positions of adjustment.

8. A loading means for valves comprising a pivoted lever having one end thereof adapted to contact with means on a valve so that lever actuates said valve when said lever is moved, a movable indicating pointer, a spring connection between said indicating pointer and said lever, and means separate from said connection for moving said lever to a predetermined position of adjustment comprising a cam means on said lever and an adjustable member contacting with said cam means.

9. In a device of the class described for opening a valve in a pressure conduit against the back pressure therein, comprising a pivoted bell crank, one arm of which is adapted to engage means on said valve to open same when said arm moves in one direction, a pointer, a spring having the opposite ends thereof connected to said pointer and other arm of said bell crank, respectively, and means separate from said spring and its connection with said pointer for moving said pointer to tension said spring.

10. A loading means for valves comprising a pivoted lever having one end thereof contacting with means on said valve so that said lever actuates said valve when said lever is moved, a movable indicating pointer, a spring, the opposite ends of which are directly connected to said indicating pointer and said lever, and means separate from said connections for moving said pointer to a predetermined position of adjustment, the pivot for said lever comprising a strap hinge formed of a continuous strip of flexible material rigidly secured to said lever and to a fixed support.

11. A pressure gauge comprising a valve, a spring, a lever having at least two arms, one of which is operatively connected to said valve and another of which is operatively connected to said spring, a pivot for said lever comprising a thin piece of flat, flexible material, a support, one end of which is rigidly secured to said support, and the other end of which is rigidly secured to said lever, the said piece of flexible material forming a pivot for said lever and extending in a direction substantially that of the resultant of the force of said spring and the force resisting pivoting of said lever under the influence of said spring.

12. A device as set forth in claim 11 in which the spring pressure is exerted in a direction substantially parallel to the arm of the lever other than that to which the spring is directly connected and in which the force resisting the rocking of said lever extends in a direction parallel to the arm to which the spring is connected.

13. In a device of the class described, the combination with a valve, of a support, a thin flat piece of spring metal secured to said support, a lever having at least two arms secured to said spring metal, a spring connected to one arm of said lever and extending substantially parallel to another arm thereof, and means for varying the tension in said spring, said second arm having operative connection with said valve to exert force thereon in a direction to open same, and said flat metal spring acting as a pivot for said lever and extending in the direction of the resultant of the force of said spring and that force acting on the arm of said lever connected to said valve which resists the rotation of said lever under the influence of said spring.

14. A device as set forth in claim 13 in which the means for tensioning said spring comprises a pivoted indicating pointer connected to said spring at a point spaced from the pivot for said pointer, and an adjustable member engaging said pointer to move said pointer in a direction opposed to the force exerted by said spring, whereby movement of said pointer by said adjustable member increases the tension in said spring, said spring moving said pointer in the opposite direction when said adjustable member is retracted.

FRED LANDBERG.
ARVID O. DAHLSTROM.